US012602604B2

(12) United States Patent
Brignoli et al.

(10) Patent No.: US 12,602,604 B2
(45) Date of Patent: Apr. 14, 2026

(54) METHOD AND SYSTEM FOR ESTIMATING DURATION AND PERFORMANCE OF A PRODUCT OVER LIFECYCLE OF THE SAME

(71) Applicant: Brembo S.p.A., Curno (IT)

(72) Inventors: Silvia Brignoli, Curno (IT); Mattia Ravasio, Curno (IT); Ajay Kumar Mishra, Sunnyvale, CA (US); Rahil Shah, Sunnyvale, CA (US)

(73) Assignee: Brembo S.p.A., Curno (IT)

( * ) Notice: Subject to any disclaimer, the term of this patent is extended or adjusted under 35 U.S.C. 154(b) by 636 days.

(21) Appl. No.: 18/147,779

(22) Filed: Dec. 29, 2022

(65) Prior Publication Data

US 2024/0220834 A1    Jul. 4, 2024

(51) Int. Cl.
*G06N 7/01* (2023.01)
*G06Q 30/0201* (2023.01)

(52) U.S. Cl.
CPC ......... *G06N 7/01* (2023.01); *G06Q 30/02016* (2025.08)

(58) Field of Classification Search
CPC ........................... G06Q 30/02016; G06N 7/01
See application file for complete search history.

(56) References Cited

U.S. PATENT DOCUMENTS

| | | | | |
|---|---|---|---|---|
| 6,473,720 | B1 * | 10/2002 | Hampson ........... | G05B 23/0235 |
| | | | | 702/182 |
| 7,315,861 | B2 | 1/2008 | Seibel et al. | |
| 7,516,175 | B1 * | 4/2009 | Greene .............. | G06Q 30/0201 |
| | | | | 705/7.29 |
| 8,065,334 | B2 * | 11/2011 | Mukherjee ............. | G06Q 10/10 |
| | | | | 707/811 |
| 2005/0283394 | A1 * | 12/2005 | McGloin ................ | G06Q 30/02 |
| | | | | 705/7.32 |
| 2018/0144277 | A1 * | 5/2018 | Srivastava ....... | G06Q 10/06315 |
| 2021/0133010 | A1 * | 5/2021 | Bhagchandani ........ | G06F 30/23 |

FOREIGN PATENT DOCUMENTS

| | | | | |
|---|---|---|---|---|
| CN | 111881259 A | 11/2020 | | |
| WO | WO-2024123114 A1 * | 6/2024 | ............. | G06Q 10/06 |
| WO | WO-2024141856 A1 * | 7/2024 | ............. | G06Q 10/20 |

OTHER PUBLICATIONS

Limon Shat et al., Forecasting Warranty Claim by Using Past Warranty and Field Usage Data, Proceedings of the 2015 Industrial and Systems Engineering Research Conference, IIE Annual Conference and Expo 2014, pp. 2477-2484; cited in the application.

* cited by examiner

*Primary Examiner* — Dylan C White
(74) *Attorney, Agent, or Firm* — Marshall & Melhorn, LLC

(57)    ABSTRACT
Application, in a single software instrument, of AI and advanced statistics methods for monitoring and analyzing quality problems over the whole lifecycle of a product is provided. A method based on web scraping techniques and AI for monitoring the product out of the warranty period is also provided.

15 Claims, 2 Drawing Sheets

Date (month)

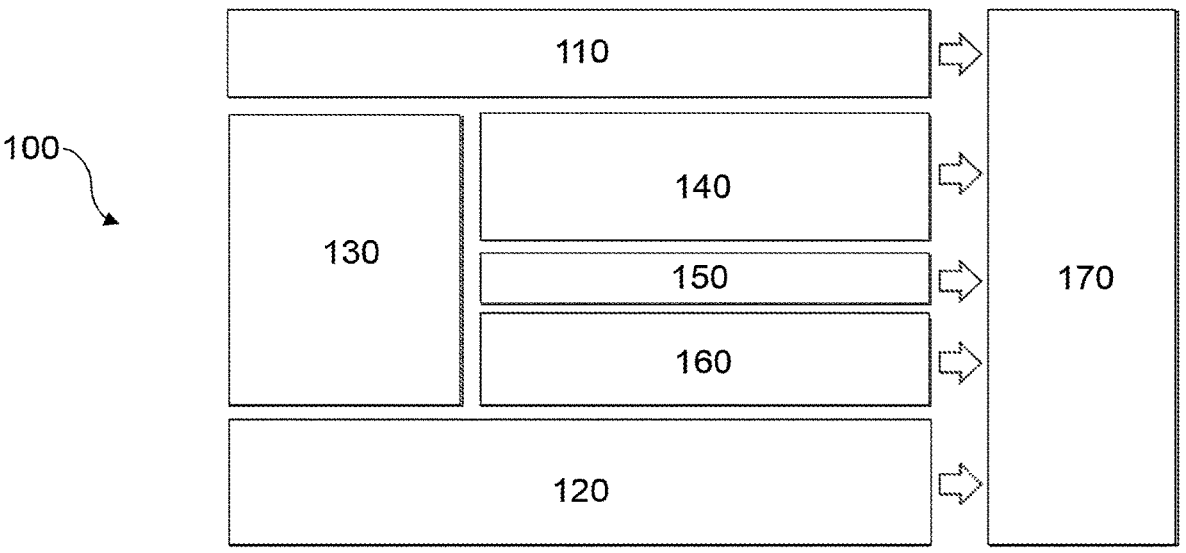
FIG.1
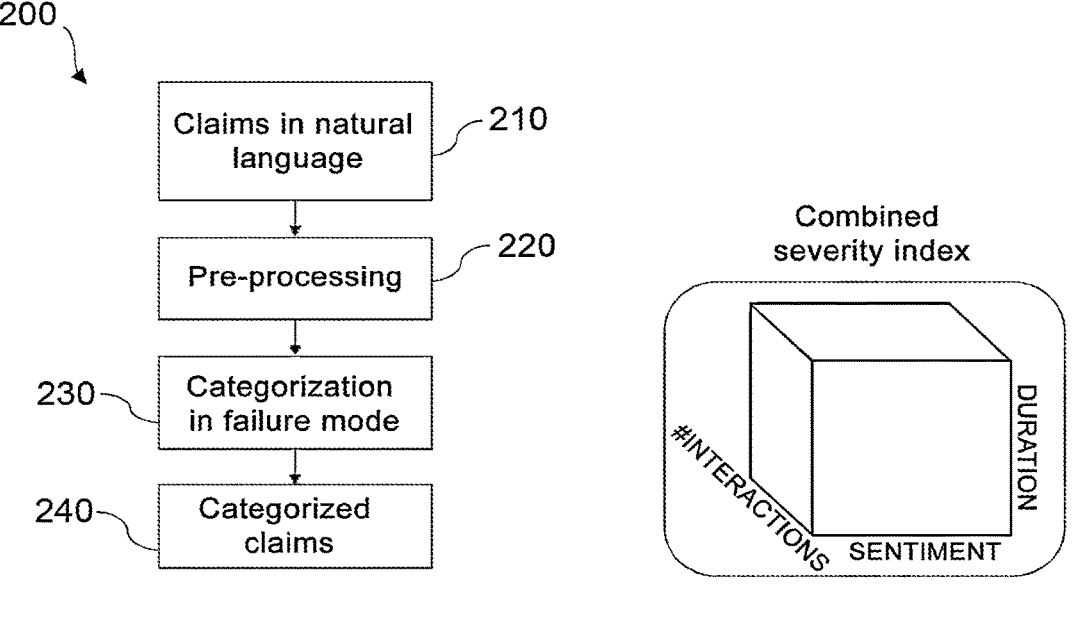
FIG.2            FIG.4

US 12,602,604 B2

1

METHOD AND SYSTEM FOR ESTIMATING DURATION AND PERFORMANCE OF A PRODUCT OVER LIFECYCLE OF THE SAME

FIELD OF THE INVENTION

The present invention relates to a method and system for estimating the duration of a product and the performance thereof over the corresponding lifecycle.

BACKGROUND OF THE INVENTION

As known, the lifecycle of a product can be divided into three macro-stages, e.g., for rolling stock:
1. Recently produced and before use ("zero kilometer");
2. period of service life under warranty ("field warranty period"); and
3. period of service life not under warranty ("out of warranty period").

Software exists for monitoring and analyzing zero-kilometer non-conformities. Softwares for managing claims during the manufacturing allow collecting the information related to the component affected by the problem, (for example: component code, number of pieces, etc.), the problem claimed by the customer, and the context in which the non-conformity was identified (for example: during which type of test, during assembly, etc.). Some instruments also allow creating and managing a flow for collecting the analyses carried out during the problem-solving step. Such software can be connected to other company databases (e.g., customer lists, product lists) and to intelligence business instruments, which allow creating graphical dashboards for monitoring specific indicators.

Furthermore, software instruments exist for monitoring the product during the period of service life under warranty. These include analysis services starting from the data relating to the warranties. These may include: geographical data, data about the type of product, data about product use, descriptive texts about the failure compiled by the spare parts workshop (claims). The analysis services found in the state of the art include: classification of claims in failure mode, display templates, predictive analyses, reliability models.

However, the methods available to date for analyzing the texts of the warranties have various limitations, including those described below.

Normally each claim is analyzed by means of NLP techniques ("Natural Language Processing") to extract the keywords therefrom, i.e., those with greater informative content, in order to trace back to the failure mode of the component. Based on techniques known at the state of the art, each claim is therefore associated with a set of failure modes with a different probability. The failure modes are predetermined and normally defined by domain experts. However, they do not correspond to the categories used by the technicians during the design (FMEA and derivatives thereof, where FMEA stands for "Failure Mode and Effect Analysis"). For this reason, the problem detected by the quality engineer with the products under warranty must be "translated" into FMEA modes or categories, before being technically solved.

The article by Limon, Shah & Yadav, Om Prakash & Nepal, Bimal (2015) "Forecasting Warranty Claim by Using Past Warranty and Field Usage Data", IIE Annual Conference and Expo 2014 (2477-2484) describes a search for faults on pieces under warranty, which cause interruptions in regular operations, leading to higher operating costs and maintenance and customer dissatisfaction. The authors suggest a prediction method based on the rate of use of the piece for predicting the trend of warranty requests. The reliability parameters in the field of the product are estimated considering the data on the warranty and on the rate of usage. In order to acquire data on usage in the field, a parameter is used, referred to as "product usage rate profile", which is treated as a random variable for managing variability problems in the product usage model. The estimated reliability parameters are used to predict claims under warranty for each period of time, using the profile of usage of customer reliability and a risk function.

As for the monitoring of quality problems after the end of the warranty period, no relevant methods are known to the Inventors.

Finally, there is no single instrument capable of monitoring and analyzing the quality problems over the whole lifecycle of the product.

U.S. Pat. No. 7,516,175 B1 relates to a method for collecting, analyzing and displaying data relating to the products under warranty. A graphical interface is available, which allows filtering the data and displaying it. It is also possible to select a report model from a list of pre-packaged models or create new ones. No detail is specified on the analyses carried out, nor the type of warranty data collected. The tone is very general, probably also because the related application dates back to 2003.

U.S. Pat. No. 8,065,334 B2 describes an instrument for monitoring problems related to product quality during the period of life under warranty. The starting data includes: data selected from a group, including warranty request data, traceability data, supplier data, producer data, seller data, customer data, component data, service data, failure data, field data, failure codes. The instrument itself collects several functions, including, in common with the present invention: text analysis in natural language and the generation, starting therefrom, of structured information, reliability product engineering, predictive analyses. An analysis of the newly produced pieces and of the pieces out of warranty is not comprised, furthermore, reliability product engineering and predictive analyses are not detailed. A method is described in document CN111881259 for automatically analyzing the failure mode frequency on electrical equipment starting from the log text analysis of the instruments in activity. A correspondence is created between keywords found in the text, which describes a failure and failure mode described by product experts. A set of keywords corresponds to every failure mode, each having a weight proportional to the probability of relationship with that failure mode. A "bag of words" model is applied to every text, which transforms each claim into a vector, where each dimension is a word appearing in the claim and the value assigned thereto is the frequency of appearance of that word in the claim. The words of the claim define a multi-dimensional space. Each failure mode can be represented by a vector in the n-dimensional space. Such a vector is populated by a domain expert, in every dimension thereof, with a value corresponding to the probability, normally normalized at 1 that the word corresponding to the dimension is indicative of the failure mode considered. The text of the single claim can be expressed as a different vector in the same n-dimensional space. In document CN111881259 the assignment of a certain text to one or more failure modes takes place by comparison (dot product between vectors) among the respective vectors in the n-dimensional space. Document U.S. Pat. No. 7,315,861 B2 presents a method for the automated surfing of web sites, such as forums, blogs and social media to search for users discussing products or services correlated to the commercial offer thereof. The post text and comments found online is analyzed with NLP techniques to process the profile of the most lucrative customers. Based on the data collected, it is possible to automatically generate customized sales scripts and direct marketing materials, which appeal to the declared or implicit interests of the found customers.

Based on this situation, it is desirable to provide a method capable of monitoring, analyzing and managing claims, in particular for failures of mechanical pieces, based on the data collected over the whole lifecycle of the product, including both official and non-official channels, in particular also based on data of the period out of warranty, therefore, out of the official channels of the customer claims, i.e., web channels.

In particular, it is desirable to estimate the operative duration of a product in use, the product being able to vary the performance thereof over the operative duration. In this sense, it is also desirable to verify the performance in use with respect to the theoretical design performance of the product or component. In fact, if an automotive component is designed to operate well for a certain number of kilometers, it is desirable to estimate the temporal occurrence of possible drops in performance due to wear and/or breakage and/or malfunctioning, and therefore, also the remaining time of operational life.

The need remains for a method and system for determining the duration of a product and the performance thereof over the corresponding lifecycle, which is effective and also allows determining quality problems in the various life stages of a product, in particular in the automotive field, e.g., for products of braking systems.

SUMMARY OF THE INVENTION

It is the object of the present invention to provide a method and system for estimating the duration of a product and the performance thereof over the corresponding life-cycle, which is, in particular, capable of monitoring, analyzing and also managing the data of the period out of the warranty, therefore out of the official channels of the customer claims.

A method and system according to the appended claims is the subject of the present invention.

BRIEF DESCRIPTION OF THE FIGURES

The present invention will now be described by way of non-limiting examples, with particular reference to the accompanying figures, in which:

FIG. 1 shows an example of high-level architecture of the system according to the present description;

FIG. 2 shows an example of logical flow of the process of processing claims, according to the solution of the present description;

FIG. 4 shows a representation of a combined severity index for a claim; and

Figure 3:
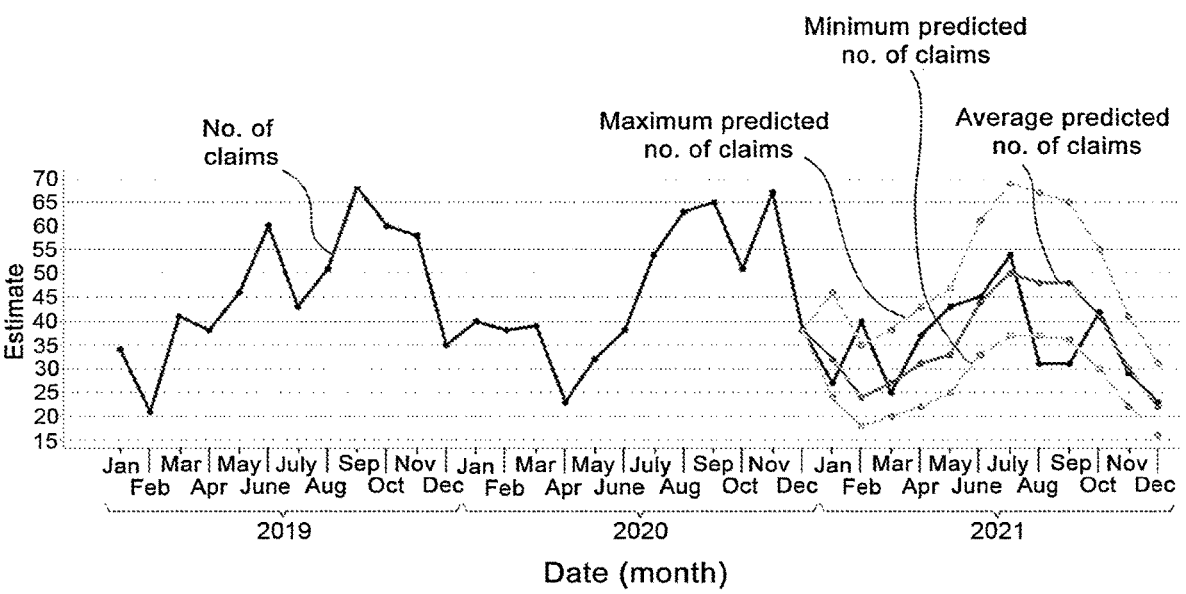
FIG. 3 shows an example of output of the reliability model, in particular the trend in time of the actual number of claims received after December 2020 (dark gray line) and the predicted trend (light gray line), with the respective confidence bands (lines with empty circles), according to an exemplary aspect of the present invention.

It is worth noting herein that elements of different embodiments can be combined together to provide further embodiments without restrictions by respecting the technical concept of the invention, as those skilled in the art will directly and unambiguously understand from the description.

The present description also relates to the prior art for the implementation thereof, regarding the detail features not described, such as elements of minor importance usually used in the prior art in solutions of the same type, for example.

When an element is introduced, it is always understood that there can be "at least one" or "one or more".

When a list of elements or features is listed in this description, it is understood that the finding according to the invention "comprises" or alternatively "consists of" such elements.

When listing features within the same sentence or bullet list, one or more of the individual features can be included in the invention without connection to the other features on the list.

Two or more of the parts (elements, devices, systems) described below can be freely associated and considered as part kits according to the invention.

DETAILED DESCRIPTION

First and foremost, a method is described for automatically processing claims, a claim being defined as a text written in natural language and potentially in different languages, regarding a service or product. The claims can be generated or obtained in each of the life stages of the product listed above.

The global architecture of the software system according to an example of the present description is shown in FIG. 1. The architecture 100 comprises a first block 110 relating to the management of problems for recently finished products (zero km for the rolling stock), a second block 120 for managing problems out of warranty, a third block 130 for managing problems under warranty. In the management of problems under warranty (which can also be used for the other analysis steps, e.g., out of warranty), a module 140 exists for categorizing claims in failure mode, a module 150 for applying a predictive model, and optionally a module 160 for applying a reliability model. The output of one or more of the described modules is passed to the display module 170.

More specifically, with reference to FIG. 2, the claims 210 in natural language are in a "pre-processing" step 220 as follows:

Translation into English (or other predetermined language); the translation is necessary as the libraries available for the subsequent analysis work on texts in this language;

·Removal of the so-called "stop words", i.e., a set of non-significant words in the text for the problem being managed (conjunctions, prepositions, articles, etc. are examples thereof);

Removal of punctuation;

Removal of numbers and special characters; and

"Stemming" (maintaining only base words in compound terms).

For each word i contained in the body of claims thus processed, the TF_IDF index is calculated, by means of state of the art processes, which takes into account the frequency and importance of each word in the body:

$$\text{tf\_idf}_i = tf_{ij} * idf_i$$

$$\text{tf\_idf}_i = tf_{ij} * idf_i$$

$$tf_{ij} = \frac{n_{ij}}{d_j}$$

$$idf_i = \log \frac{|D|}{|\{d:i \in d\}|}$$

where $n_{ij}$ is the number of occurrence of the word i in class j and d' is the number of terms in class j and |D| is the number of predefined classes for problems of the specific product.

Words with a higher TF_IDF index constitute the set of so-called "keywords", i.e., words with a greater informative content for the problem being managed. The list (typically not hierarchical) of keywords is periodically updated in the database so as to also consider the most recent data available.

The next step consists of associating each keyword extracted with one or more FMEA categories, i.e., categories of failure modes, with which that keyword might be associated.

The operation of association is carried out automatically, by using a probability map compiled by one or more domain experts.

The probability map is a document (table) in which a set of failure modes is associated with each keyword extracted from the body of the claims, each with a weight proportional to the probability that the keyword is linked to that failure mode. Such a weight is established beforehand by the domain expert based on their skills in the field.

For each keyword, the weights associated with the failure modes add up to 1 as in the following example:

| Keyword | Failure Mode | Weight |
|---|---|---|
| Air | Spongy | 0.5 |
| | Not bleedable | 0.4 |
| | Leakage | 0.1 |
| Seal | Leakage | 0.6 |
| | Reservoir leakage | 0.4 |

Making the problems described in the body of the claims correspond to the failure modes present in FMEA allows:

Exploiting company know-how in relation to the operation of the products and processes thereof.

Identifying the root cause of the problem signaled more precisely and selecting (operator, case by case) the corrective action to be implemented more quickly (step excluded from the solution of the present description);

Speeding up risk analyses as the information of the risk is directly obtainable from the FMEA.

Comparing the number of occurrences of one same failure mode for different components/products or the like for identifying which are the most exposed to a particular risk (or problem).

Analyzing the impact of a specific failure mode at different times of the product lifecycle by means of specific indicators (e.g., MERF at 3, 12, 24 months or at other regular intervals)".

Using the information collected to automatically update the "frequency" parameter in the FMEA analyses.

Identification, by an operator, of a failure mode and failure effects not included to date in FMEA.

The aforesaid specific indicators (in general KPI), the MERF "Manufacturing Engineering Repair Frequency" represents the number of claims per production date of the claimed vehicle. If i is the month of production, x the number of claims, y the number of vehicles produced and sold and n the repair date from which the warranty activation date is subtracted, the MERF is calculated as follows:

$$\text{MERF}_{i:3months} = (x_{i:n \leq 3months}/y_i) \cdot 100$$

and the same holds for 12 or 24 months or other predetermined time interval.

As for the "frequency" parameter, a "frequency" is defined in the FMEA analysis for each failure mode. The frequency represents the number of historical occurrences of that failure mode (e.g., 1 occurrence every 100.000 pieces sold). The method of the present description allows extracting, from the data, the number of occurrences for each failure mode, and thus the frequency. The frequency is then "combined" with two more parameters—gravity and detectability—to identify the intervention priority (see AIAG&VDA FMEA manual).

Once the probability map is available, it is possible to proceed with the categorization 230 of each claim in the corresponding failure mode. This is carried out as follows.

For each keyword found in the text of the claim the weight distribution for the corresponding failure modes is saved in the probability map. The weights of the different failure modes are added to the keywords contained in the claim. The failure mode with greatest weight is the relevant category of the claim. One example of this procedure is shown in the following table, where a claim reports that "Clutch has been bled up several times but keeps going weak. Slave cylinder found to be very creaky and noisy, so replaced. Then found clutch master cylinder to be taking air in, customer also reported fluid leak from clutch reservoir". The keywords reported in the table below were extracted from such a claim:

| |
|---|
| air |
| bleed |
| creaky |
| fluid |
| leak |
| noisy |
| reservoir | and weights were given to the failure categories as shown in the following table:

| | |
|---|---|
| NOISE | 3 |
| SPONGY | 2.8 |
| LEAKAGE | 2.1 |

Thus, the failure mode "Noise" is saved in 240 as it has greatest weight. Advantageously, but not restrictively, the second failure mode with second greatest weight is also saved. This is particularly advantageous in two cases:

1. The two failure modes saved correspond to the concurrence of two failure modes in the same claim.
2. The most probable failure mode corresponds to the category "other" (ambiguous description) and therefore gives no useful information in the claim category (e.g., "loses" can mean fluid loss or pressure loss").

The approach to categorization, taking advantage of a probability map instead of algorithms based on AI, is advantageous as it also allows correctly categorizing claims containing infrequent keywords. If we consider that for each component, based on the Owner's experience, most of the claims are categorized into few dominant failure modes, it is clear that a supervised AI algorithm could hardly categorize the infrequent keywords correctly.

Analysis of Zero-Kilometer Problems

The analysis of zero-kilometer problems, i.e., problems arising in the producer's plant or identified on the customer's production lines and which are the producer's responsibility, takes place as described below.

The starting data relates to claims found in the producer's plant or by the customer on the production lines thereof, which are the producer's responsibility. Such data can include metadata, such as one or more of the following: data of the customer making the claim or of the production line on which it was identified, information relating to the component being considered (production date, component code, etc.), date of identification of the problem, number of non-conforming pieces claimed, as well as the preliminary description in natural language, as actual text in the claim, of the problem encountered.

After returning the material of the defective pieces, an in-depth analysis is carried out on each one. At this stage, the data already available relating to each claim is made available to at least one operator who will complete it by entering, into the common database, further information arising in the analysis center, including, for example, one or more from the following list: detailed description of the problem after an in-depth analysis, classification of the problem identified in terms of the type and gravity, selected containment actions, list of analyses carried out and results thereof, root cause identified, responsibility/source of the problem, selected containment and corrective actions, checks to be carried out on the efficacy of the corrective actions, activities to be carried out for standardization.

For each of the actions to be implemented, a "task" object is created in the software, representative of a specific activity to be completed. Some parameters are defined for each task, including at least: owner/people in charge, expiry date and description of the actions involved.

It is possible to apply the method according to the present description to the preliminary description of the problem encountered, compiled at the producer/customer's plant and/or to the detailed description, compiled by the in-house quality operator following the in-depth analysis. The output of the analysis is the classification of the texts into FMEA categories.

The starting data (starting texts of the claims and texts originating from the in-depth analysis), enriched according to the presented methods, are then used to calculate specific quality indicators, including, for example: PPM (parts per million, for example, ppm per type of component, per month, etc.) of the pieces claimed by the customer. It is further possible to automatically display the data collected and the indicators calculated in a dashboard (graphical interface), by means of graphical displays including, for example: Pareto charts for identifying the most claimed components, recurrent problems, claims with the greatest impact, etc.

Analyses of the Problems in the Warranty Period

The analysis of quality problems during the period covered by the warranty takes place in accordance with the above method in the zero-kilometer case.

The starting data includes texts, in natural language and a priori in different languages, of the claims relating to own products under warranty, sent from the spare parts workshops.

The output of the analysis can be graphically displayed, for example, by means of a graphical dashboard or web application.

Furthermore, such information can be related to other data, if available, including:

Metadata for claims received, saved in a database, including, for example, one or more from the following list: the customer they come from, geographical area, date of visit to workshop/shop and of repair, start date of the warranty, customer code for the component repaired or replaced, age of the vehicle in terms of time or wear (mileage covered in the case of automotive products).

Company information, saved in database, including, for example, one or more from the following list: volumes of product sold in time, repair costs sustained, product codes, bills of materials.

A particularly complete database of quality problems during the warranty period is obtained, by opportunely relating (table join operations) the above data.

The data contained therein can be displayed in different ways. Furthermore, it is possible to create indicators of interest and automatically display the value thereof. A number of classical indicators fall within the indicators of interest, e.g., one or more from the following list: standard indicators, such as MERF ("Manufacturing Engineering Repair Frequency": the indicator represents the number of claims per production date of the claimed vehicle), ACPU ("Average Cost Per Unit": Average unit cost, i.e., the total cost sustained for warranty expenses relating to vehicles produced in a determined period with respect to the number of vehicles produced in the same period), time-to-failure.

Finally, the greater the number of pieces of information contained in the assembled database, the greater the resolution, which can be obtained in relation to quality problems. By filtering the data, it is possible to observe the indicators of interest on the scope of a specific customer, component, etcetera.

The monitoring part of the quality problems during the warranty period is completed by a predictive part comprising:

1. A predictive model, at the state of the art, which, starting from the data of products sold and claims over the course of time, allows predicting the number of claims in the future (claims of all types, e.g., for faulty pieces).

2. Optionally, a state of the art reliability model, which, starting from the data of the claims in time and the mileage for each vehicle when the intervention under warranty was requested, predicts the probability of failure after a certain service of the product.

The model takes into account the different failure modes. In particular, a parametric distribution is interpolated for each failure mode and the single models are finally combined in a global model (known as such).

By taking advantage of the processed reliability model and the mission profile (i.e., the distribution in time of the service rendered by the component, processed starting from usage data of the vehicle or obtained from another source (customer)) of the considered products, the number of claims, which will be received in the future, is calculated using standard methods. One example of output of the reliability model is shown in FIG. 3. The prediction of claims allows not having to wait too long to collect sufficient feedback on the duration and reliability of the product, and thus intervening earlier on the redesign of the product and the production chain, as well as on the programing of corrective actions for the products already in use.

With respect to the predictive model (as a function of the years of possession or the age of the piece or component), the reliability model is more precise, especially for products where the occurrence of a fault is mainly dictated by physical phenomenon of wear. This is, for example, the case of products linked to the braking system of a vehicle (on a per-kilometer basis of the piece).

Here it should be noted that the number of claims in time is an indication greatly correlated to the number of verified failures of the component or product, and therefore, it is indicative of the reliability or performance and duration of, or service life of the product itself. Therefore, the solution of the present description solves the problem of determining or estimating the performance and duration or service life of a product departing from the scope of production and tests and is used in real life. This information is useful for improving the production techniques and design of the product itself in order to increase the reliability and duration thereof.

In the present description, in each embodiment, the "performance" can be considered as described by, or correlated to metadata, claim, failure mode, future estimate of the number of failures expected, as indicated herein.

Here it should be noted that there may be cases of component replacement without having a corresponding claim. However, this percentage of unclaimed replacements is generally known or predictable, and therefore, downstream or in addition to the method described, it is possible to estimate the service life of the component.

Here it should be considered that a "service life" can consistently be understood to mean an average life or average life with a predetermined interval/type of malfunctioning.

Analyses of Problems Out of the Warranty Period

Finally, a method is presented for monitoring quality problems in the period of service life of the product not under warranty ("out of warranty period" stage) or problems related to products still under warranty, but for which the repair/replacement intervention is not recognized in the scope covered by the warranty.

By means of web scraping techniques, web pages are explored (forums, blogs, social media) containing discussion threads about the products of interest. The post text, which initiated the thread and the text of related comments are saved in a database, together with metadata, such as URL, post tile, author of the comment, date. The automated analysis of videos for extracting texts and metadata therefrom is also included in the present description, in the term "web scraping". One example of a dataset extracted from the web is shown in the following table:

| date | url | post_title | post_author | comment_number | comment_author | comment_date | original_text |
|---|---|---|---|---|---|---|---|
| 2022-05-31 16:35:36.534573 | https:// www.scramblerforum.com/ threads/disk-warping-issues.3004/ | Disk warping issues? | Joooooooosh | 1 | Joooooooosh | 29 Jul. 2015 | After feeling some vibration from the front brake, I began to think the front rotor had warped. Took it into Ducati Lincoln who confirmed and placed a warranty claim. Interestingly they pointed out that badly adjusted aftermarket levers can sometimes cause problems but not to this extent. I was told that if levers have no free play, the force of the air at higher speeds can apply small amounts of front brake or pull the clutch. To me, that sounds like the biggest load of rubbish but wondered if anyone else has come across that before? I'm worried that overheating disks could be a common problem, it seems I'm not the only one to be unlucky. |
| 2022-05-31 16:35:36.534573 | https:// www.scramblerforum.com/ threads/disk-warping-issues.3004/ | Disk warping issues? | Joooooooosh | 2 | tonyjuliano | 29 Jul. 2015 | A much more likely scenario would be one in which the fitting of the aftermarket level prevented the brake from being completely disengaged, therefore building up heat and warping the disk. I've actually seen this happen. |
| 2022-05-31 16:35:36.534573 | https:// www.scramblerforum.com/ threads/disk-warping-issues.3004/ | Disk warping issues? | Joooooooosh | 3 | Joooooooosh | 29 Jul. 2015 | I agree, that would be a perfectly reasonable statement but they tried to make out that me not leaving more than a tiny bit of slack could have contributed. I prefer having no 'dead zone' so I get a more instant brake response and slightly quicker shifts. The thought that the wind could depress the levers is kind of laughable to me though . . . Either way, just looking forward to a new disk, to get rid of this vibration. Do you know if it's a wise idea to |

-continued

| date | url | post_title | post_author | comment_number | comment_author | comment_date | original_text |
|------|-----|-----------|-------------|----------------|----------------|--------------|---------------|
| | | | | | | | change the pads at the same time? I don't know if pads and disks wear together in the same way chain and sprockets do. |

It is also possible to treat as discussion threads articles from specialist magazines or the text generated from the audio of videos available online and related comments (all objects comprised among those in web scraping).

From a formal point of view, the text of the first element of a thread is considered on a par with a comment.

The texts are processed according to the above method for the other product stages. For each comment, the result is a list of keywords relating to the failure modes with the related weights and the relevant category of the comment, with the related weights, saved in a database. Additionally, in the case of comments obtained from the web, it is advantageous to directly extract, from the text, other information belonging to the predefined categories, which are of interest for the product considered. For example, in the field of components for the automotive field, such categories include at least: vehicle producer, vehicle model, mileage, words describing the failure, sentiment, name of the component.

For each predefined category, a list of words included in that category is available in a database (for example, the category "producer" can include the names of vehicle producers) and/or one or more rules, allowing identification, in the text, of the strings belonging to that category (for example: the category "mileage" is populated when, in the text of a comment, the pattern is found: number followed by length measurement unit, e.g. "5 km" or "12 mi").

The output of this process is a table, where a column has been added to the set of initial data, with the identified keywords and a sentiment column determined based on such keywords. For each comment and for each category, all of the words belonging to that category and the number of times they appear in the comment are saved.

To extract information belonging to the predefined categories from every thread text, it is possible to use automatic extraction algorithms by means of searches of alphanumerical sequences or by using ML algorithms, in particular "Named Entity Recognition" (NER). NER is a technique for extracting information, which tries to identify and classify the named entities mentioned in a non-structured text in predefined categories, such as names of people, organizations, localities, codes, expressions of time, quantities, etc. The trained algorithm can analyze every comment and extract the words therefrom belonging to the different predefined categories.

Finally, a sentiment analysis algorithm, at the state of the art, can additionally process a score for each comment, indicative of the sentiment (positive, negative or neutral) expressed in the text. This sentiment parameter is strongly correlated to the impact and seriousness of the failure of the product or component, and therefore contributes to defining the intervention priorities.

The non-structured information contained in the texts extracted from the web is thus structured (populated categories) and enriched (failure mode+sentiment) and, saved in a database, constituting the basis for the processing of metrics for monitoring quality problems out of the warranty period. The output of this processing is shown in the above table.

It is possible to combine the data extracted for each text belonging to a discussion thread and extract combined information for each thread, including, for example:

Number of comments following the first thread element;

Difference between the start date of the thread and the date of the last comment;

Global sentiment, obtained by averaging the sentiment calculated for each text of the thread;

Number of repetitions of each keyword in the thread;

Dominant failure mode or set of failure modes in decreasing order of probability.

One example of aggregated output is shown in the following table (divided horizontally into two):

POST INFORMATION

| url | post_title | post_author | #INTERACTION (comments/answer) | FIRST DATE | LAST DATE | POST SENTIMENT | POST SENTIMENT CONFIDENCE SCORE |
|-----|-----------|-------------|-------------------------------|------------|-----------|----------------|--------------------------------|
| https://www.scramblerforum.com/threads/disk-warping-issues.3004/ | Disk warping issues? | Joooooooosh | 168 | 29/7/20215 | 27 Apr. 2022 | negative | {'positive': 0.31, 'neutral': 0.17, 'negative': 0.51} |

KEY-WORDS FAMILY AND WEIGHT

| PRODUCER | VEHICLE | MILEAGE | FAILURE MODE | PRODUCT SENTIMENT | COMPONENT | GEOINFORMATION | REPETITIVENESS |
|----------|---------|---------|--------------|-------------------|-----------|----------------|----------------|
| Ducati 34 | Scrambler 21 | 1000 km 1 | fault 7 | like 29 | aftermarket | australia 4 | years 8 |
| BMW 1 | SS version 1 | 2500 | fitted 10 | feel 19 | disc | Bonneville 1 | still 15 |
| Triumph 8 | GS 1 z1000 1 | miles 1 | replace 45 | paid 1 | wheel | | repeat 4 |
| | | 30000 km | 012 mm | good 22 | line | | times 8 |
| | | | runout 1 | surprise 4 | metalgear | | recurring 1 |

-continued

| KEY-WORDS FAMILY AND WEIGHT | | | | | | | |
|---|---|---|---|---|---|---|---|
| PRODUCER | VEHICLE | MILEAGE | FAILURE MODE | PRODUCT SENTIMENT | COMPONENT | GEOINFORMATION | REPETITIVENESS |
|  |  | 1 | disc | folks 2 | rotor |  | 2nd 2 |
|  |  | 6000 | movement 2 | quality controls 1 | steel disc |  | same thing 4 |
|  |  | miles 1 | pulsating 20 | worse 5 | scotchbrite |  |  |
|  |  |  | warp 53 | dangerous 2 | pad |  |  |
|  |  |  | sign 6 | . . . | oem |  |  |
|  |  |  | slow 8 |  | ebc |  |  |
|  |  |  | hear 9 |  | FD475G1375 |  |  |
|  |  |  | thinner 1 |  | front |  |  |
|  |  |  | transmitted 1 |  | . . . |  |  |
|  |  |  | . . . |  |  |  |  |

Starting from the combined data of the single threads and filtering texts with negative sentiment, it is possible to process the indicators for monitoring quality problems, including, for example, one or more of the following parameters:

The number of negative threads out of the total;

A severity index combining the duration of a thread, the number of interactions and the sentiment index (cf. FIG. 4). An indicator like this is useful for identifying the most critical threads (i.e., those with a greater duration and number of interactions and very negative sentiment, and therefore subsequently the action priorities) or, filtering on different products, to make comparisons. It can be linked to the physical failure by means of FMEA analysis, which is made offline by the operator.

For each thread, the interactions per unit of time.

The keywords principally associated with a certain failure mode. This indicator is useful for understanding which words the users use to describe a specific problem.

One or more of the values of the indicators described above, including the time trend and with the possibility of filtering all fields available, can be displayed in the graphical dashboard. In the dashboard, it is also possible to display detail information for all the texts belonging to a certain thread.

An instrument such as the one described has the following strengths, allowing:

Anticipating problems. Claims from workshops/retailers are normally delivered periodically, sometimes on an annual basis. Furthermore, it is not always possible starting from the text of the claim to extract clear information about a problem. In this sense, the method described for those cases out of warranty is complementary to the methods presented in the points for 0 km cases or cases under warranty.

Assembling knowledge of the performance of one's products out of the warranty period, for which there would otherwise be no information.

Allowing a rapid response to the occurrence of problems, containing the negative impact on the image of the company and the brand thereof.

Monitoring the temporal evolution of the perception and physical state of the products.

The outputs of the methods in the various product conditions (0 km, warranty, out of warranty) can be provided by means of a single display instrument (dashboard or web app), thus creating a single instrument for monitoring the data relating to quality in all stages of the product lifecycle.

The availability of an instrument, which is unique for this purpose, has the following advantages:

creating a complete view of the level of quality perceived by the customer;

creating a complete view of the customer experience to improve the product;

creating a complete view of the level of quality of a specific component during the lifecycle thereof, from production until after the end of the warranty period; and identifying the stages of the product lifecycle which are mostly prone to problems or which are the source of physical problems and cause most customer dissatisfaction in order to correctly direct resources and plans for improvement.

As compared to the technique stated above in document CN111881259, in the present description, the attribution of one or more failure modes to a claim does not occur by means of vector representations in a multidimensional space, but it occurs by extracting keywords from the claim and mapping them in failure mode, taking advantage of a probability map compiled by the domain experts, with a significant simplification in calculation and greater estimate efficacy.

Further Implementation Details

The described method was implemented as follows.

In the case of 0-km products, the data relating to the claims resides in a database. All the data generated by the analyses carried out on the pieces is collected by means of graphical interface and saved in a database, with at least one key relating to the table, which contains the data relating to the claims. The processing algorithm of the claims can be implemented on two modules: one for preparing data and one for categorization. Typically, the second functionally depends on the result of the first, so they operate in series by means of a data pipeline. The two modules are managed by an "orchestrator", which monitors the lifecycle and operation thereof.

In the case of products under warranty, the data relating to the claims resides in a database and the algorithm for processing the claims can be implemented on two modules: one for preparing data and one for categorization. Typically, the second functionally depends on the result of the first, so they operate in series by means of a data pipeline. The two modules are managed by an "orchestrator", which monitors the lifecycle and operation thereof.

The predictive algorithms can be implemented as functions directly in the display instrument. The two can be carried out in parallel, i.e., they are independent of each other.

Generalizing the above, it can be said that the architectural pattern of the application is with micro-services. The claims can come from API and/or reside in a database and/or on a spreadsheet. The output of the application can be provided by means of API, database or spreadsheet or dashboard.

The predictive algorithms could be encapsulated in modules and orchestrated into a cluster other than that where the application for products under warranty resides. This is advantageous if one desires to ensure the segregation of the application with respect to that shown for the 0-km products, both in terms of logic and safety.

In the case of products out of warranty, the module, which deals with collecting and elaborating web comments, can be developed on cloud. Web scraping can be carried out by means of a script or with API calls to third-party services. Web scraping is carried out periodically by virtue of a cron job which obtains the text of the comments in raw format. The activity of importing the datum activates a pipeline for processing and refining the information. The output is saved in a persistent data lake, where it is possible to observe the elaborations upon request.

For the calculation with the predictive model of the number of claims as a function of the time referred to above, it is possible to calculate in 150 the number of claims 335 expected for the product, as a function of time, by means of a statistic prediction algorithm, based on the probability weights of each failure mode and the failure mode with greatest weight of the respective texts of the one or more previously managed claims.

In order to implement the calculation 160 of a probability of failure of the product as a function of the time, with respect to a predetermined failure mode, it can be carried out based on the number of claims 335 over time and respective time of use of the product extracted from the metadata of said one or more claims. One possible mathematical calculation model is known and described in the article by *Limon* et al. (section 2.4) mentioned above, clearly only to be taken for this calculation because, as we explained, the overall method presents problems. Other implementation techniques are possible according to the present and future state of the art.

Such a calculation 160 can be repeated for each failure mode and then the respective failure probabilities can be linearly combined, obtaining an overall failure probability of the product as a function of time.

All of the above described implementation methods can reside both on local server and in cloud, as well as in hybrid mode.

Figure 5:
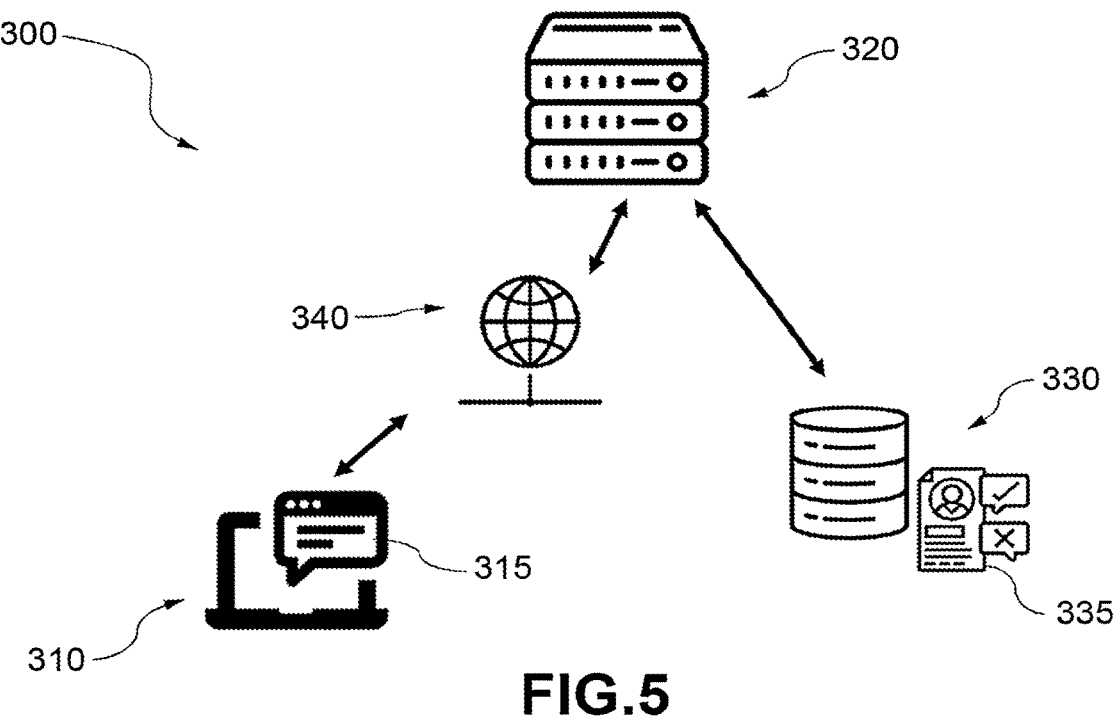
FIG. 5 shows an example of a computerized system implementing the method of the present description.

With reference to FIG. 5, a possible hardware implementation of the method of the present description is shown. The system 300 comprises a server 320, a database 330 connected to said server, a client 310 connected to said server through a telecommunication network 340, Internet conveniently.

The server 320 is configured to perform the web scraping in accordance with the above description, while the client 310 is configured with a graphical interface 315 to carry out the display step described above.

The database 330 is configured to store the outputs of one or more steps of the method described above, and in particular, the various claims 335 (also from web scraping), and it can be included in said server or it can be remotely connected thereto. Furthermore, a direct connection between client 310 and database 330 is not indicated, but this can be conveniently provided.

The described system allows monitoring the problems signaled on the component from the early stages of production till after the end of the warranty period. It is further possible to extend the scope to the steps before the production also including software allowing the management of the criticalities emerged during the design and validation of the component.

Preferred embodiments have been described above and some variants of the present invention have been suggested, but it is understood that those skilled in the art may make modifications and changes without departing from the related scope of protection, as defined by the appended claims.

What is claimed is:

1. A computer-implemented method for estimating duration and performance of a product over a lifecycle of the same, comprising the following steps:
  a) obtaining and saving in a database one or more claims of users about the product, the one or more claims each comprising a respective text and respective metadata;
  b) analyzing respective texts and establishing for each one a respective list of keywords of the respective text;
  c) for each keyword of the respective list of keywords, assigning and saving in the database a respective probability weight for each failure mode of a predefined list of failure modes;
  d) for each failure mode, adding up the probability weights of the failure mode for each keyword of step c) for each respective text;
  e) selecting and saving in the database the failure mode with greatest weight obtained in step d) for each respective text;
  f) calculating the number of claims expected on the product, as a function of time, by a statistic prediction algorithm, based on the probability weights of each failure mode and the failure mode with greatest weight of the respective texts of the one or more claims;
    wherein said one or more claims comprise at least one claim consisting of a text obtained by web scraping and related metadata extracted from the text;
  g) displaying one or more pieces of information calculated in steps b) to f) on a graphical interface;
  h) redesigning a physical product based on one or more pieces of information calculated in steps b) to f) to create a new product design with improved reliability or duration; and
  i) producing the physical product according to the new product design.

2. The method of claim 1, wherein the product is a motor vehicle component.

3. The method of claim 2, wherein the motor vehicle component is a component of a braking system.

4. The method of claim 1, wherein said metadata comprises one or more of product producer, product model, registered product life, product name, product mission profile.

5. The method of claim 1, wherein said failure modes are failure mode effect analysis (FMEA) modes.

6. The method of claim 1, wherein, in step e), a second failure mode with a second greatest weight is additionally selected and stored, and steps f) and g) are carried out for the second failure mode as well or only for the second failure mode where the first failure mode is a general mode in the list of failure modes.

7. The method of claim 1, wherein an analysis text is obtained with related metadata for the product following a manual inspection, and the analysis text with related metadata is processed as a claim according to steps a) to e), and step f) is carried out again based on the list of keywords, the respective probability weights and the failure mode with greatest weight for each respective text according to steps a)-e) and for said analysis text.

8. The method of claim 1, wherein the related metadata in the text obtained by web scraping is extracted by using Machine Learning algorithms.

9. The method of claim 1, wherein the related metadata in the text obtained by web scraping is extracted by using Named Entity Recognition (NER).

10. The method of claim 1, wherein for each respective text, a parameter indicative of user sentiment, is determined by a sentiment analysis algorithm, saved in said database, and used in step g).

11. The method of claim 10, wherein, before step f), a severity index of the failure is calculated based on the parameter indicative of user sentiment, and in the case of texts obtained by web scraping on thread, also based on duration of the thread, number of interactions, and the failure mode.

12. The method of claim 1, the method further comprising, after step f):

f1) calculating a respective fault probability of the product with respect to a predetermined failure mode, as a function of time, based on the number of claims during a period of time and a respective time of use of the product extracted from the metadata of said one or more claims.

13. The method of claim 12, wherein step f1) is repeated for each failure mode and subsequently the respective failure probabilities are linearly combined, obtaining an overall failure probability of the product as a function of the time.

14. A system for determining duration and performance of a product over a lifecycle of the same, the system comprising:

a server;

a database connected to said server; and a client connected to said server through a telecommunication network;

wherein:

the server is configured to perform web scraping and steps a)-f) of a computer-implemented method for estimating duration and performance of a product over a lifecycle of the same, comprising the following steps:

a) obtaining and saving in a database one or more claims of users about the product, the one or more claims each comprising a respective text and respective metadata;

b) analyzing respective texts and establishing for each one a respective list of keywords of the respective text;

c) for each keyword of the respective list of keywords, assigning and saving in the database a respective probability weight for each failure mode of a pre-defined list of failure modes;

d) for each failure mode, adding up the probability weights of the failure mode for each keyword of step c) for each respective text;

e) selecting and saving in the database the failure mode with greatest weight obtained in step d) for each respective text;

f) calculating the number of claims expected on the product, as a function of time, by a statistic prediction algorithm, based on the probability weights of each failure mode and the failure mode with greatest weight of the respective texts of the one or more claims;

wherein said one or more claims comprise at least one claim consisting of a text obtained by web scraping and related metadata extracted from the text; and g) displaying one or more pieces of information calculated in steps b) to f) on a graphical interface;

h) redesigning a physical product based on one or more pieces of information calculated in steps b) to f) to create a new product design with improved reliability or duration; and i) producing the physical product according to the new product design, wherein the client is configured with a graphical interface to perform step g); and the database is configured to store outputs of steps a) to f).

15. The system of claim 14, wherein an analysis text is entered into the client and communicated by the client to the server, the analysis text being obtained with related metadata for the product following a manual inspection, the analysis text with related metadata being processed as a claim according to steps a) to e), wherein step f) is carried out again based on the list of keywords, the respective probability weights and the failure mode with greatest weight for each respective text according to steps a)-e) and for the analysis text.

* * * * *